US012660823B2

(12) United States Patent
Panchatsharam et al.

(10) Patent No.: US 12,660,823 B2
(45) Date of Patent: Jun. 23, 2026

(54) FUNGICIDAL COMBINATIONS

(71) Applicants: UPL Corporation Limited, Port Louis (MU); UPL Europe LTD, Warrington (GB)

(72) Inventors: Vaidyalingam Panchatsharam, Mumbai (IN); Nanda Kumar, Durham, NC (US); Dario Narvaez, Wildwood, MO (US)

(73) Assignees: UPL CORPORATION LIMITED, Port Louis (MU); UPL EUROPE LTD, Warrington (GB)

( * ) Notice: Subject to any disclaimer, the term of this patent is extended or adjusted under 35 U.S.C. 154(b) by 274 days.

(21) Appl. No.: 18/087,353

(22) Filed: Dec. 22, 2022

(65) Prior Publication Data

US 2023/0200392 A1 Jun. 29, 2023

Related U.S. Application Data

(60) Provisional application No. 63/293,373, filed on Dec. 23, 2021.

(51) Int. Cl.
| *A01N 43/653* | (2006.01) |
| *A01N 37/22* | (2006.01) |
| *A01N 43/32* | (2006.01) |
| *A01N 47/34* | (2006.01) |
| *A01P 3/00* | (2006.01) |

(52) U.S. Cl.
CPC ........... *A01N 43/653* (2013.01); *A01N 37/22* (2013.01); *A01N 43/32* (2013.01); *A01N 47/34* (2013.01); *A01P 3/00* (2021.08)

(58) Field of Classification Search
None
See application file for complete search history.

(56) References Cited

U.S. PATENT DOCUMENTS

| 9,700,056 | B2* | 7/2017 | Wachendorff-Neumann ............... A01N 43/653 |
| 2008/0039431 | A1* | 2/2008 | Cleary ................. A01N 43/653 514/357 |
| 2013/0109725 | A1* | 5/2013 | Dave ...................... A01N 25/14 514/352 |
| 2014/0228212 | A1* | 8/2014 | Pedersen ................ A01N 63/20 424/93.3 |
| 2016/0150786 | A1* | 6/2016 | Menges ................. A01N 37/18 424/93.46 |
| 2018/0092363 | A1* | 4/2018 | Van Der Lelie ....... A01N 63/23 |
| 2020/0315173 | A1* | 10/2020 | Jin .......................... A01N 43/84 |

* cited by examiner

*Primary Examiner* — Sahana S Kaup
*Assistant Examiner* — Ashlee E Wertz
(74) *Attorney, Agent, or Firm* — CANTOR COLBURN LLP

(57) ABSTRACT

The present disclosure relates to fungicidal combinations, compositions including the fungicidal combinations, and to a method of controlling fungal diseases using the combinations. The combination includes at least one demethylation inhibitor; at least one succinate dehydrogenase (SDH) inhibitor; at least one RNA polymerase I inhibitor; and at least one ß-tubulin assembly inhibitor and/or at least one multi-site fungicide.

4 Claims, No Drawings

FUNGICIDAL COMBINATIONS

CROSS-REFERENCE TO RELATED APPLICATIONS

This application claims priority to U.S. Provisional Application 63/293,373 filed on Dec. 23, 2021, which is incorporated herein by reference in its entirety.

FIELD OF INVENTION

The present disclosure relates to fungicidal combinations, compositions comprising the fungicidal combinations, and to a method of controlling fungal diseases using the combinations.

BACKGROUND

Fungicides are a type of pesticide useful for killing and/or controlling the growth of unwanted fungi and their spores. Profitable crop production depends on effective pest control. Fungicides are an integral and important tool wielded by farmers to achieve effective control of fungi, in order to increase the yield and quality of crops. The activity of fungicides can be enhanced in various ways to achieve maximum benefit. One method for improving fungicidal activity is to use a combination of fungicides. However, the effectiveness of a given combination varies depending on the type of fungus (pest) to be controlled and the type of plant affected by the pest. For example, different pests affect different crops and respond to different fungicides to varying extents. Also crop sensitivity varies based on the type of fungicides being used. As a result, it is challenging to identify an appropriate fungicidal combination, the agrochemical application rate of the fungicidal combination, and the ratio of each fungicide in the combinations needed to achieve efficacious control.

There are a variety of different types of fungicides, including multi-site fungicides and systemic fungicides. However, as crop tolerance decreases, lower use rates are imposed, and fungal resistance is increasingly observed. Therefore, there is a need for alternative treatments having broader disease control, curative and preventive functions, and a lower dosage requirement.

Therefore, embodiments of the present disclosure ameliorate one or more of the above-mentioned problems.

SUMMARY

An objective of the present disclosure is to provide a fungicidal combination comprising at least one demethylation inhibitor, at least one succinate dehydrogenase (SDH) inhibitor, at least one RNA polymerase I inhibitor and at least one ß-tubulin assembly inhibitor and/or at least one multi-site fungicide.

Another objective of the present disclosure is to provide a composition comprising at least one demethylation inhibitor, at least one succinate dehydrogenase inhibitor, at least one RNA polymerase I inhibitor and at least one ß-tubulin assembly inhibitor and/or at least one multi-site fungicide.

Another objective of the present disclosure is to provide a method of controlling fungi comprising applying to the locus of a fungus a combination comprising at least one demethylation inhibitor, at least one succinate dehydrogenase inhibitor, at least one RNA polymerase I inhibitor at least one ß-tubulin assembly inhibitor and/or at least one multi-site fungicide.

Yet another objective of the present disclosure is to provide a method of overcoming resistance of fungi using a combination comprising at least one demethylation inhibitor, at least one succinate dehydrogenase inhibitor, at least one RNA polymerase I inhibitor at least one ß-tubulin assembly inhibitor and/or at least one multi-site fungicide.

Yet another objective of the present disclosure is to provide a method of reducing phytotoxicity using a combination comprising at least one demethylation inhibitor, at least one succinate dehydrogenase inhibitor, at least one RNA polymerase I inhibitor and at least one ß-tubulin assembly inhibitor and/or at least one multi-site fungicide.

It has surprisingly and unexpectedly been found that combinations comprising at least one demethylation inhibitor, at least one succinate dehydrogenase inhibitor, at least one RNA polymerase I inhibitor and at least one ß-tubulin assembly inhibitor and/or at least one multi-site fungicide exhibit control of fungi, overcome resistance of fungi, and/or show reduced phytotoxicity.

In an aspect, the present disclosure provides a combination comprising at least one demethylation inhibitor, at least one succinate dehydrogenase inhibitor, at least one RNA polymerase I inhibitor and at least one ß-tubulin assembly inhibitor and/or at least one multi-site fungicide.

In an aspect, the present disclosure provides a composition comprising at least one demethylation inhibitor, at least one succinate dehydrogenase inhibitor, at least one RNA polymerase I inhibitor and at least one ß-tubulin assembly inhibitor and/or at least one multi-site fungicide.

In an aspect, the present disclosure provides a method of controlling fungi using comprising applying to the locus of a fungus a combination comprising at least one demethylation inhibitor, at least one succinate dehydrogenase inhibitor, at least one RNA polymerase I inhibitor and at least one ß-tubulin assembly inhibitor and/or at least one multi-site fungicide.

In an aspect, the present disclosure provides a method of overcoming resistance of fungi using a combination comprising at least one demethylation inhibitor, at least one succinate dehydrogenase inhibitor, at least one RNA polymerase I inhibitor and at least one ß-tubulin assembly inhibitor and/or at least one multi-site fungicide.

In one aspect, the present disclosure provides a method of reducing phytotoxicity using a combination comprising at least one demethylation inhibitor, at least one succinate dehydrogenase inhibitor, at least one RNA polymerase I inhibitor and at least one ß-tubulin assembly inhibitor and/or at least one multi-site fungicide.

DETAILED DESCRIPTION

Before describing the present invention in detail, it is to be understood that this invention is not limited to particularly exemplified systems or process parameters that may of course, vary. It is also to be understood that the terminology used herein is for the purpose of describing particular embodiments of the invention only and is not intended to limit the scope of the invention in any manner. The use of examples anywhere in this specification including examples of any terms discussed herein is illustrative only, and in no way limits the scope and meaning of the invention or of any exemplified term.

It must be noted that, as used in this specification, the singular forms "a," "an" and "the" include plural referents unless the content clearly dictates otherwise. The terms "preferred" and "preferably" refer to embodiments of the invention that may afford certain benefits, under certain circumstances.

As used herein, the terms "comprising" "including," "having," "containing," "involving," and the like are to be understood to be open-ended, i.e., to mean including but not limited to.

The term "plant propagation material" refers to the parts of the plant, such as seeds, which can be used for the propagation of the plant and vegetative plant material. There may be mentioned, e.g., the seeds (in the strict sense), roots, fruits, tubers, bulbs, rhizomes as parts of plants. Germinated plants or young plants, which may be transplanted after germination or after emergence from the soil, are included herein.

The term "seed" embraces seeds and plant propagules of all kinds including but not limited to true seeds, seed pieces, suckers, corms, bulbs, fruit, tubers, grains, cuttings, cut shoots and the like. In a preferred embodiment a seed is a true seed.

"Fungicidal" refers to the ability of a substance to decrease or inhibit growth of fungi.

To "control" or "controlling" fungus means to inhibit, and/or suppress the ability of fungus to grow and/or reproduce, or to limit fungus damage or loss in crop plants or denotes control and prevention of a disease. Controlling effects include all deviation from natural development, for example: killing, retardation, decrease of the disease.

The term "locus" as used herein shall denote the vicinity of a desired crop in which control of the spread of phytopathogenic fungi is desired. The locus includes the vicinity of desired crop plants wherein the phytopathogenic fungi infection has either emerged or is most likely to emerge or is yet to emerge.

According to the present disclosure, "increased yield" of an agricultural plant means that the yield of a product of the respective plant is increased by a measurable amount over the yield of the same product of the plant produced under the same conditions, but without the application of the compositions described herein.

According to the present disclosure, it is preferred that the crop yield be increased by at least 0.5%, preferred at least 2%, more preferred at least 5%, upon application of the combinations and compositions described herein. Accordingly, there is provided a fungicidal combination useful in combating *Rhizoctonia fungi*. The composition also increases the vigor/yield of the plant.

The term "about" or "approximately" as used herein is inclusive of the stated value and means within an acceptable range of deviation for particular value as determined by one of ordinary skill in the art, considering the measurement in question and the error associated with measurement of the particular quantity (i.e., the limitations of the measurement system). For example, "about" can mean within one or more standard deviations, or within ±10 or ±5 of the stated value. Recitation of ranges of values are merely intended to serve as a shorthand method of referring individually to each separate value falling within the range, unless otherwise indicated herein, and each separate value is incorporated into the specification as if it were individually recited herein. The endpoints of all ranges are included within the range and independently combinable. It is understood that where a parameter range is provided, all integers within that range, and tenths thereof, are also provided. For example, "0.1-80%" includes 0.1%, 0.2%, 0.3%, etc. up to 80%.

Surprisingly, the problems explained above are solved by the combination of the active compounds and/or methods as defined herein.

The present inventors have unexpectedly found that the application of the present fungicidal combination results in a significant enhancement in the crop plant health, crop yield as well as in the reduction of fungal diseases. The improvement in crop health and reduction in fungal diseases have been brought about by applying the present combination comprising at least one demethylation inhibitor, at least one succinate dehydrogenase inhibitor, at least one RNA polymerase I inhibitor and one or more of ß-tubulin assembly inhibitors and multi-site fungicides.

Demethylation inhibitors (a type of sterol synthesis inhibitors) inhibit the biosynthesis of ergosterol which is a major component of the plasma membrane of certain fungi and needed for fungal growth.

Succinate dehydrogenase is an enzyme involved in cell respiration. Succinate Dehydrogenase Inhibitors blocks development of fungi by blocking respiration.

RNA polymerase I inhibitor fungicides inhibit mycelial growth and spore formation.

Multiple fungi are resistant to demethylation inhibitors, succinate dehydrogenase and RNA polymerase I inhibitors. Also, these fungicides show unsatisfactory level of % fungal control.

In an embodiment, there is provided, a fungicidal combination comprising:
(a) at least one demethylation inhibitor;
(b) at least one succinate dehydrogenase inhibitor;
(c) at least one RNA polymerase I inhibitor; and
(d) at least one ß-tubulin assembly inhibitor and/or at least one multi-site fungicide.

In an embodiment, the demethylation inhibitor fungicide comprises azaconazole, bitertanol, bromuconazole, cyproconazole, difenoconazole, diniconazole, epoxiconazole, etaconazole, fenbuconazole, fluquinconazole, flusilazole, flutriafol, hexaconazole, imibenconazole, ipconazole, mefentrifluconazole, metconazole, myclobutanil, penconazole, propiconazole, simeconazole, tebuconazole, tetraconazole, triadimefon, triadimenol, triticonazole, prothioconazole, or a combination thereof.

In an embodiment, the SDH inhibitor comprises benodanil, boscalid, carboxin, fenfuram, flutolanil, furametpyr, mepronil, oxycarboxin, penthiopyrad, thifluzamide, or a combination thereof.

In an embodiment, the RNA polymerase I inhibitor comprises benalaxyl, furalaxyl, metalaxyl, metalaxyl-m, oxadixyl, ofurace, or a combination thereof.

In an embodiment, the ß-tubulin assembly inhibitor comprises benomyl, carbendazim, fuberidazole, thiabendazole, thiophanate, thiophanate-methyl, or a combination thereof.

In an embodiment, the multisite inhibitor comprises ferbam, mancozeb, maneb, metiram, propineb, thiram, zineb, ziram, captan, captafol, folpet, chlorothalonil, dichlofluanid, tolylfluanid, dodine, guazatine, iminoctadine, anilazine, dithianon, or a combination thereof.

In an embodiment, there is provided, a fungicidal combination comprising:
(a) at least one demethylation inhibitor comprising azaconazole, bitertanol, bromuconazole, cyproconazole, difenoconazole, diniconazole, epoxiconazole, etaconazole, fenbuconazole, fluquinconazole, flusilazole, flutriafol, hexaconazole, imibenconazole, ipconazole, mefentrifluconazole, metconazole, myclobutanil, penconazole, propiconazole, simeconazole, tebuconazole, tetraconazole, triadimefon, triadimenol, triticonazole, prothioconazole, or a combination thereof;

(b) at least one succinate dehydrogenase inhibitor comprising benodanil, boscalid, carboxin, fenfuram, flutolanil, furametpyr, mepronil, oxycarboxin, penthiopyrad, thifluzamide, or a combination thereof;

(c) at least one RNA polymerase I inhibitor comprising benalaxyl, furalaxyl, metalaxyl, metalaxyl-m, oxadixyl, ofurace, or a combination thereof; and (d) at least one ß-tubulin assembly inhibitor fungicide comprising benomyl, carbendazim, fuberidazole, thiabendazole, thiophanate, thiophanate-methyl or a combination thereof and/or multisite fungicide comprising ferbam, mancozeb, maneb, metiram, propineb, thiram, zineb, ziram, captan, captafol, folpet, chlorothalonil, dichlofluanid, tolylfluanid, dodine, guazatine, iminoctadine, anilazine, dithianon, or a combination thereof.

In a preferred embodiment, the demethylation inhibitor fungicide is ipconazole.

In a preferred embodiment, the ß-tubulin assembly inhibitor fungicide is thiabendazole.

In a preferred embodiment, the RNA polymerase I inhibitor is metalaxyl or metalaxyl-m.

In another preferred embodiment, the ß-tubulin assembly inhibitor is thiophanate or thiophanate methyl.

In a preferred embodiment, the SDHI is carboxin.

In a preferred embodiment, the multisite fungicide is thiram.

In an embodiment, the fungicidal combination of demethylation inhibitor, succinate dehydrogenase inhibitor, RNA polymerase I inhibitor, and ß-tubulin assembly inhibitor are present in a ratio ranging from about 1:1-100:1-100:1-100.

In an embodiment, the metalaxyl, ipconazole, carboxin and thiophanate are present in a ratio of 1:1.25:20:5.

In an embodiment, metalaxyl, ipconazole, carboxin and thiabendazole are present in a ratio of 1:1.25:20:25.

In an embodiment, the SDHI inhibitor fungicide is applied in an amount in the range from 10 to 50 g ai/100 kg of seeds.

In an embodiment, the demethylation inhibitor fungicide is applied in an amount in the range from 1 to 5 g ai/100 kg of seeds.

In an embodiment, the RNA polymerase I inhibitor fungicide is applied in an amount in the range from 1 to 5 g ai/100 kg of seeds.

In an embodiment, the ß-tubulin assembly inhibitor fungicide is applied in an amount in the range from 10 to 60 g ai/100 kg of seeds.

In an embodiment, the multi-site fungicide is applied in an amount in the range from 200 to 300 g ai/kg of seeds.

In an embodiment, ipconazole is applied in an amount in the range from 1 to 5 g ai/100 kg of seeds.

In a preferred embodiment, ipconazole is applied in an amount in the range from 2 to 3 g ai/100 kg of seeds.

In an embodiment, thiabendazole is applied in an amount in the range from 10 to 60 g ai/100 kg of seeds.

In a preferred embodiment, thiabendazole is applied in an amount in the range from 20 to 50 g ai/100 kg of seeds.

In an embodiment, carboxin is applied in an amount in the range from 10 to 60 g ai/100 kg of seeds.

In a preferred embodiment, carboxin is applied in an amount in the range from 20 to 40 g ai/100 kg of seeds.

In an embodiment, metalaxyl or metalaxyl-m is applied in an amount in the range from 1 to 5 g ai/100 kg of seeds.

In a preferred embodiment, metalaxyl or metalaxyl-m is applied in an amount in the range from 2 to 3 g ai/100 kg of seeds.

In an embodiment, thiophanate is applied in the range from 10 to 40 g ai/100 kg of seeds.

In a preferred embodiment, thiophanate is applied in the range from 20-30 g ai/100 kg of seeds.

In an embodiment, thiram is applied in an amount in the range from 200 to 300 g ai/kg.

In a preferred embodiment, thiram is applied in an amount in the range from 220 to 250 g ai/kg.

In an embodiment, there is provided, a fungicidal combination comprising:

(a) at least one demethylation inhibitor comprising ipconazole;

(b) at least one succinate dehydrogenase inhibitor comprising carboxin;

(c) at least one RNA polymerase I inhibitor comprising metalaxyl or metalaxyl-m; and (d) at least one ß-tubulin assembly inhibitor fungicide comprising benomyl, carbendazim, fuberidazole, thiabendazole, thiophanate, thiophanate-methyl, or a combination thereof.

In an embodiment, there is provided, a fungicidal combination comprising:

(a) at least one demethylation inhibitor comprising ipconazole;

(b) at least one succinate dehydrogenase inhibitor comprising carboxin;

(c) at least one RNA polymerase I inhibitor comprising metalaxyl or metalaxyl-m; and (d) at least one ß-tubulin assembly inhibitor fungicide comprising thiophanate or thiophanate-methyl.

In an embodiment, there is provided, a fungicidal combination comprising:

(a) at least one demethylation inhibitor comprising ipconazole;

(b) at least one succinate dehydrogenase inhibitor comprising carboxin;

(c) at least one RNA polymerase I inhibitor comprising metalaxyl or metalaxyl-m; and (d) at least one ß-tubulin assembly inhibitor fungicide comprising thiabendazole.

In an embodiment, there is provided, a fungicidal combination comprising:

(a) at least one demethylation inhibitor comprising ipconazole;

(b) at least one succinate dehydrogenase inhibitor comprising carboxin;

(c) at least one RNA polymerase I inhibitor comprising metalaxyl or metalaxyl-m; and (d) at least one multisite fungicide comprising ferbam, mancozeb, maneb, metiram, propineb, thiram, zineb, ziram, captan, captafol, folpet, chlorothalonil, dichlofluanid, tolylfluanid, dodine, guazatine, iminoctadine, anilazine, dithianon, or a combination thereof.

In an embodiment, there is provided, a fungicidal combination comprising:

(a) at least one demethylation inhibitor comprising ipconazole;

(b) at least one succinate dehydrogenase inhibitor comprising carboxin;

(c) at least one RNA polymerase I inhibitor comprising metalaxyl or metalaxyl-m; and (d) at least multisite fungicide comprising thiram.

In an embodiment, there is provided, a fungicidal combination comprising:

(a) at least one demethylation inhibitor comprising ipconazole;

(b) at least one succinate dehydrogenase inhibitor comprising carboxin;

(c) at least one RNA polymerase I inhibitor comprising metalaxyl or metalaxyl-m; and (d) at least one ß-tubulin assembly inhibitor fungicide comprising one or more of thiophanate, thiophanate-methyl and thiabendazole and/or multisite fungicide comprising thiram.

In all fungicidal combinations embodying the principle of the instant invention, demethylation inhibitor fungicides include their derivatives such as salts, esters, ethers, solvates, hydrates and polymorphs.

In all fungicidal combinations embodying the principle of the instant invention, SDHI fungicides include their derivatives such as salts, esters, ethers, solvates, hydrates and polymorphs.

In all fungicidal combinations embodying the principle of the instant invention, RNA polymerase I inhibitors include their derivatives such as salts, esters, ethers, solvates, hydrates and polymorphs.

In all fungicidal combinations embodying the principle of the instant invention, ß-tubulin assembly inhibitor fungicides include their derivatives such as salts, esters, ethers, solvates, hydrates and polymorphs.

In all fungicidal combinations embodying the principle of the instant invention, multisite fungicides include their derivatives such as salts, esters, ethers, solvates, hydrates and polymorphs.

In an embodiment, in addition to at least one demethylation inhibitor, at least one succinate dehydrogenase inhibitor, and at least one RNA polymerase I inhibitor, multiple ß-tubulin assembly inhibitor fungicides are present in the combination.

In an embodiment, in addition to at least one demethylation inhibitor, at least one succinate dehydrogenase inhibitor, and at least one RNA polymerase I inhibitor, multiple multisite fungicides are present in the combination.

In an embodiment, in addition to at least one demethylation inhibitor, at least one succinate dehydrogenase inhibitor, and at least one RNA polymerase I inhibitor, at least one ß-tubulin assembly inhibitor fungicide and at least one multisite fungicide are present in the combination.

Below table provides list of some examples of fungicidal combinations according to the present invention.

TABLE 1

| Sr. No. | Demethyl-ation inhibitor | Succinate dehydro-genase inhibitor | RNA polymerase I inhibitor | ß-tubulin assembly inhibitor and/or multisite fungicide |
| --- | --- | --- | --- | --- |
| 1. | Ipconazole | Benodanil | Benalaxyl | Thiabendazole |
| 2. | Ipconazole | Benodanil | Benalaxyl | Thiophanate |
| 3. | Ipconazole | Benodanil | Benalaxyl | Thiophanate-methyl |
| 4. | Ipconazole | Benodanil | Benalaxyl | Mancozeb |
| 5. | Ipconazole | Benodanil | Benalaxyl | Thiram |
| 6. | Ipconazole | Benodanil | Benalaxyl | Captan |
| 7. | Ipconazole | Benodanil | Benalaxyl | Captafol |
| 8. | Ipconazole | Benodanil | Benalaxyl | Chlorothalonil |
| 9. | Ipconazole | Benodanil | Furalaxyl | Thiabendazole |
| 10. | Ipconazole | Benodanil | Furalaxyl | Thiophanate |
| 11. | Ipconazole | Benodanil | Furalaxyl | Thiophanate-methyl |
| 12. | Ipconazole | Benodanil | Furalaxyl | Mancozeb |
| 13. | Ipconazole | Benodanil | Furalaxyl | Thiram |
| 14. | Ipconazole | Benodanil | Furalaxyl | Captan |
| 15. | Ipconazole | Benodanil | Furalaxyl | Captafol |
| 16. | Ipconazole | Benodanil | Furalaxyl | Chlorothalonil |

TABLE 1-continued

| Sr. No. | Demethyl-ation inhibitor | Succinate dehydro-genase inhibitor | RNA polymerase I inhibitor | ß-tubulin assembly inhibitor and/or multisite fungicide |
| --- | --- | --- | --- | --- |
| 17. | Ipconazole | Benodanil | Metalaxyl/ Metalaxyl-m | Thiabendazole |
| 18. | Ipconazole | Benodanil | Metalaxyl/ Metalaxyl-m | Thiophanate |
| 19. | Ipconazole | Benodanil | Metalaxyl/ Metalaxyl-m | Thiophanate-methyl |
| 20. | Ipconazole | Benodanil | Metalaxyl/ Metalaxyl-m | Mancozeb |
| 21. | Ipconazole | Benodanil | Metalaxyl/ Metalaxyl-m | Thiram |
| 22. | Ipconazole | Benodanil | Metalaxyl/ Metalaxyl-m | Captan |
| 23. | Ipconazole | Benodanil | Metalaxyl/ Metalaxyl-m | Captafol |
| 24. | Ipconazole | Benodanil | Metalaxyl/ Metalaxyl-m | Chlorothalonil |
| 25. | Ipconazole | Benodanil | Oxadixyl | Thiabendazole |
| 26. | Ipconazole | Benodanil | Oxadixyl | Thiophanate |
| 27. | Ipconazole | Benodanil | Oxadixyl | Thiophanate-methyl |
| 28. | Ipconazole | Benodanil | Oxadixyl | Mancozeb |
| 29. | Ipconazole | Benodanil | Oxadixyl | Thiram |
| 30. | Ipconazole | Benodanil | Oxadixyl | Captan |
| 31. | Ipconazole | Benodanil | Oxadixyl | Captafol |
| 32. | Ipconazole | Benodanil | Oxadixyl | Chlorothalonil |
| 33. | Ipconazole | Benodanil | Ofurace | Thiabendazole |
| 34. | Ipconazole | Benodanil | Ofurace | Thiophanate |
| 35. | Ipconazole | Benodanil | Ofurace | Thiophanate-methyl |
| 36. | Ipconazole | Benodanil | Ofurace | Mancozeb |
| 37. | Ipconazole | Benodanil | Ofurace | Thiram |
| 38. | Ipconazole | Benodanil | Ofurace | Captan |
| 39. | Ipconazole | Benodanil | Ofurace | Captafol |
| 40. | Ipconazole | Benodanil | Ofurace | Chlorothalonil |
| 41. | Ipconazole | Boscalid | Benalaxyl | Thiabendazole |
| 42. | Ipconazole | Boscalid | Benalaxyl | Thiophanate |
| 43. | Ipconazole | Boscalid | Benalaxyl | Thiophanate-methyl |
| 44. | Ipconazole | Boscalid | Benalaxyl | Mancozeb |
| 45. | Ipconazole | Boscalid | Benalaxyl | Thiram |
| 46. | Ipconazole | Boscalid | Benalaxyl | Captan |
| 47. | Ipconazole | Boscalid | Benalaxyl | Captafol |
| 48. | Ipconazole | Boscalid | Benalaxyl | Chlorothalonil |
| 49. | Ipconazole | Boscalid | Furalaxyl | Thiabendazole |
| 50. | Ipconazole | Boscalid | Furalaxyl | Thiophanate |
| 51. | Ipconazole | Boscalid | Furalaxyl | Thiophanate-methyl |
| 52. | Ipconazole | Boscalid | Furalaxyl | Mancozeb |
| 53. | Ipconazole | Boscalid | Furalaxyl | Thiram |
| 54. | Ipconazole | Boscalid | Furalaxyl | Captan |
| 55. | Ipconazole | Boscalid | Furalaxyl | Captafol |
| 56. | Ipconazole | Boscalid | Furalaxyl | Chlorothalonil |
| 57. | Ipconazole | Boscalid | Metalaxyl/ Metalaxyl-m | Thiabendazole |
| 58. | Ipconazole | Boscalid | Metalaxyl/ Metalaxyl-m | Thiophanate |
| 59. | Ipconazole | Boscalid | Metalaxyl/ Metalaxyl-m | Thiophanate-methyl |
| 60. | Ipconazole | Boscalid | Metalaxyl/ Metalaxyl-m | Mancozeb |
| 61. | Ipconazole | Boscalid | Metalaxyl/ Metalaxyl-m | Thiram |
| 62. | Ipconazole | Boscalid | Metalaxyl/ Metalaxyl-m | Captan |
| 63. | Ipconazole | Boscalid | Metalaxyl/ Metalaxyl-m | Captafol |
| 64. | Ipconazole | Boscalid | Metalaxyl/ Metalaxyl-m | Chlorothalonil |
| 65. | Ipconazole | Boscalid | Oxadixyl | Thiabendazole |
| 66. | Ipconazole | Boscalid | Oxadixyl | Thiophanate |
| 67. | Ipconazole | Boscalid | Oxadixyl | Thiophanate-methyl |
| 68. | Ipconazole | Boscalid | Oxadixyl | Mancozeb |
| 69. | Ipconazole | Boscalid | Oxadixyl | Thiram |
| 70. | Ipconazole | Boscalid | Oxadixyl | Captan |
| 71. | Ipconazole | Boscalid | Oxadixyl | Captafol |
| 72. | Ipconazole | Boscalid | Oxadixyl | Chlorothalonil |
| 73. | Ipconazole | Boscalid | Ofurace | Thiabendazole |
| 74. | Ipconazole | Boscalid | Ofurace | Thiophanate |
| 75. | Ipconazole | Boscalid | Ofurace | Thiophanate-methyl |

9

TABLE 1-continued

| Sr. No. | Demethyl- ation inhibitor | Succinate dehydro- genase inhibitor | RNA polymerase I inhibitor | β-tubulin assembly inhibitor and/or multisite fungicide |
|---|---|---|---|---|
| 76. | Ipconazole | Boscalid | Ofurace | Mancozeb |
| 77. | Ipconazole | Boscalid | Ofurace | Thiram |
| 78. | Ipconazole | Boscalid | Ofurace | Captan |
| 79. | Ipconazole | Boscalid | Ofurace | Captafol |
| 80. | Ipconazole | Boscalid | Ofurace | Chlorothalonil |
| 81. | Ipconazole | Carboxin | Benalaxyl | Thiabendazole |
| 82. | Ipconazole | Carboxin | Benalaxyl | Thiophanate |
| 83. | Ipconazole | Carboxin | Benalaxyl | Thiophanate-methyl |
| 84. | Ipconazole | Carboxin | Benalaxyl | Mancozeb |
| 85. | Ipconazole | Carboxin | Benalaxyl | Thiram |
| 86. | Ipconazole | Carboxin | Benalaxyl | Captan |
| 87. | Ipconazole | Carboxin | Benalaxyl | Captafol |
| 88. | Ipconazole | Carboxin | Benalaxyl | Chlorothalonil |
| 89. | Ipconazole | Carboxin | Furalaxyl | Thiabendazole |
| 90. | Ipconazole | Carboxin | Furalaxyl | Thiophanate |
| 91. | Ipconazole | Carboxin | Furalaxyl | Thiophanate-methyl |
| 92. | Ipconazole | Carboxin | Furalaxyl | Mancozeb |
| 93. | Ipconazole | Carboxin | Furalaxyl | Thiram |
| 94. | Ipconazole | Carboxin | Furalaxyl | Captan |
| 95. | Ipconazole | Carboxin | Furalaxyl | Captafol |
| 96. | Ipconazole | Carboxin | Furalaxyl | Chlorothalonil |
| 97. | Ipconazole | Carboxin | Metalaxyl/ Metalaxyl-m | Thiabendazole |
| 98. | Ipconazole | Carboxin | Metalaxyl/ Metalaxyl-m | Thiophanate |
| 99. | Ipconazole | Carboxin | Metalaxyl/ Metalaxyl-m | Thiophanate-methyl |
| 100. | Ipconazole | Carboxin | Metalaxyl/ Metalaxyl-m | Mancozeb |
| 101. | Ipconazole | Carboxin | Metalaxyl/ Metalaxyl-m | Thiram |
| 102. | Ipconazole | Carboxin | Metalaxyl/ Metalaxyl-m | Captan |
| 103. | Ipconazole | Carboxin | Metalaxyl/ Metalaxyl-m | Captafol |
| 104. | Ipconazole | Carboxin | Metalaxyl/ Metalaxyl-m | Chlorothalonil |
| 105. | Ipconazole | Carboxin | Oxadixyl | Thiabendazole |
| 106. | Ipconazole | Carboxin | Oxadixyl | Thiophanate |
| 107. | Ipconazole | Carboxin | Oxadixyl | Thiophanate-methyl |
| 108. | Ipconazole | Carboxin | Oxadixyl | Mancozeb |
| 109. | Ipconazole | Carboxin | Oxadixyl | Thiram |
| 110. | Ipconazole | Carboxin | Oxadixyl | Captan |
| 111. | Ipconazole | Carboxin | Oxadixyl | Captafol |
| 112. | Ipconazole | Carboxin | Oxadixyl | Chlorothalonil |
| 113. | Ipconazole | Carboxin | Ofurace | Thiabendazole |
| 114. | Ipconazole | Carboxin | Ofurace | Thiophanate |
| 115. | Ipconazole | Carboxin | Ofurace | Thiophanate-methyl |
| 116. | Ipconazole | Carboxin | Ofurace | Mancozeb |
| 117. | Ipconazole | Carboxin | Ofurace | Thiram |
| 118. | Ipconazole | Carboxin | Ofurace | Captan |
| 119. | Ipconazole | Carboxin | Ofurace | Captafol |
| 120. | Ipconazole | Carboxin | Ofurace | Chlorothalonil |
| 121. | Ipconazole | Fenfuram | Benalaxyl | Thiabendazole |
| 122. | Ipconazole | Fenfuram | Benalaxyl | Thiophanate |
| 123. | Ipconazole | Fenfuram | Benalaxyl | Thiophanate-methyl |
| 124. | Ipconazole | Fenfuram | Benalaxyl | Mancozeb |
| 125. | Ipconazole | Fenfuram | Benalaxyl | Thiram |
| 126. | Ipconazole | Fenfuram | Benalaxyl | Captan |
| 127. | Ipconazole | Fenfuram | Benalaxyl | Captafol |
| 128. | Ipconazole | Fenfuram | Benalaxyl | Chlorothalonil |
| 129. | Ipconazole | Fenfuram | Furalaxyl | Thiabendazole |
| 130. | Ipconazole | Fenfuram | Furalaxyl | Thiophanate |
| 131. | Ipconazole | Fenfuram | Furalaxyl | Thiophanate-methyl |
| 132. | Ipconazole | Fenfuram | Furalaxyl | Mancozeb |
| 133. | Ipconazole | Fenfuram | Furalaxyl | Thiram |
| 134. | Ipconazole | Fenfuram | Furalaxyl | Captan |
| 135. | Ipconazole | Fenfuram | Furalaxyl | Captafol |
| 136. | Ipconazole | Fenfuram | Furalaxyl | Chlorothalonil |
| 137. | Ipconazole | Fenfuram | Metalaxyl/ Metalaxyl-m | Thiabendazole |
| 138. | Ipconazole | Fenfuram | Metalaxyl/ Metalaxyl-m | Thiophanate |
| 139. | Ipconazole | Fenfuram | Metalaxyl/ Metalaxyl-m | Thiophanate-methyl |

10

TABLE 1-continued

| Sr. No. | Demethyl- ation inhibitor | Succinate dehydro- genase inhibitor | RNA polymerase I inhibitor | β-tubulin assembly inhibitor and/or multisite fungicide |
|---|---|---|---|---|
| 140. | Ipconazole | Fenfuram | Metalaxyl/ Metalaxyl-m | Mancozeb |
| 141. | Ipconazole | Fenfuram | Metalaxyl/ Metalaxyl-m | Thiram |
| 142. | Ipconazole | Fenfuram | Metalaxyl/ Metalaxyl-m | Captan |
| 143. | Ipconazole | Fenfuram | Metalaxyl/ Metalaxyl-m | Captafol |
| 144. | Ipconazole | Fenfuram | Metalaxyl/ Metalaxyl-m | Chlorothalonil |
| 145. | Ipconazole | Fenfuram | Oxadixyl | Thiabendazole |
| 146. | Ipconazole | Fenfuram | Oxadixyl | Thiophanate |
| 147. | Ipconazole | Fenfuram | Oxadixyl | Thiophanate-methyl |
| 148. | Ipconazole | Fenfuram | Oxadixyl | Mancozeb |
| 149. | Ipconazole | Fenfuram | Oxadixyl | Thiram |
| 150. | Ipconazole | Fenfuram | Oxadixyl | Captan |
| 151. | Ipconazole | Fenfuram | Oxadixyl | Captafol |
| 152. | Ipconazole | Fenfuram | Oxadixyl | Chlorothalonil |
| 153. | Ipconazole | Fenfuram | Ofurace | Thiabendazole |
| 154. | Ipconazole | Fenfuram | Ofurace | Thiophanate |
| 155. | Ipconazole | Fenfuram | Ofurace | Thiophanate-methyl |
| 156. | Ipconazole | Fenfuram | Ofurace | Mancozeb |
| 157. | Ipconazole | Fenfuram | Ofurace | Thiram |
| 158. | Ipconazole | Fenfuram | Ofurace | Captan |
| 159. | Ipconazole | Fenfuram | Ofurace | Captafol |
| 160. | Ipconazole | Fenfuram | Ofurace | Chlorothalonil |
| 161. | Ipconazole | Flutolanil | Benalaxyl | Thiabendazole |
| 162. | Ipconazole | Flutolanil | Benalaxyl | Thiophanate |
| 163. | Ipconazole | Flutolanil | Benalaxyl | Thiophanate-methyl |
| 164. | Ipconazole | Flutolanil | Benalaxyl | Mancozeb |
| 165. | Ipconazole | Flutolanil | Benalaxyl | Thiram |
| 166. | Ipconazole | Flutolanil | Benalaxyl | Captan |
| 167. | Ipconazole | Flutolanil | Benalaxyl | Captafol |
| 168. | Ipconazole | Flutolanil | Benalaxyl | Chlorothalonil |
| 169. | Ipconazole | Flutolanil | Furalaxyl | Thiabendazole |
| 170. | Ipconazole | Flutolanil | Furalaxyl | Thiophanate |
| 171. | Ipconazole | Flutolanil | Furalaxyl | Thiophanate-methyl |
| 172. | Ipconazole | Flutolanil | Furalaxyl | Mancozeb |
| 173. | Ipconazole | Flutolanil | Furalaxyl | Thiram |
| 174. | Ipconazole | Flutolanil | Furalaxyl | Captan |
| 175. | Ipconazole | Flutolanil | Furalaxyl | Captafol |
| 176. | Ipconazole | Flutolanil | Furalaxyl | Chlorothalonil |
| 177. | Ipconazole | Flutolanil | Metalaxyl/ Metalaxyl-m | Thiabendazole |
| 178. | Ipconazole | Flutolanil | Metalaxyl/ Metalaxyl-m | Thiophanate |
| 179. | Ipconazole | Flutolanil | Metalaxyl/ Metalaxyl-m | Thiophanate-methyl |
| 180. | Ipconazole | Flutolanil | Metalaxyl/ Metalaxyl-m | Mancozeb |
| 181. | Ipconazole | Flutolanil | Metalaxyl/ Metalaxyl-m | Thiram |
| 182. | Ipconazole | Flutolanil | Metalaxyl/ Metalaxyl-m | Captan |
| 183. | Ipconazole | Flutolanil | Metalaxyl/ Metalaxyl-m | Captafol |
| 184. | Ipconazole | Flutolanil | Metalaxyl/ Metalaxyl-m | Chlorothalonil |
| 185. | Ipconazole | Flutolanil | Oxadixyl | Thiabendazole |
| 186. | Ipconazole | Flutolanil | Oxadixyl | Thiophanate |
| 187. | Ipconazole | Flutolanil | Oxadixyl | Thiophanate-methyl |
| 188. | Ipconazole | Flutolanil | Oxadixyl | Mancozeb |
| 189. | Ipconazole | Flutolanil | Oxadixyl | Thiram |
| 190. | Ipconazole | Flutolanil | Oxadixyl | Captan |
| 191. | Ipconazole | Flutolanil | Oxadixyl | Captafol |
| 192. | Ipconazole | Flutolanil | Oxadixyl | Chlorothalonil |
| 193. | Ipconazole | Flutolanil | Ofurace | Thiabendazole |
| 194. | Ipconazole | Flutolanil | Ofurace | Thiophanate |
| 195. | Ipconazole | Flutolanil | Ofurace | Thiophanate-methyl |
| 196. | Ipconazole | Flutolanil | Ofurace | Mancozeb |
| 197. | Ipconazole | Flutolanil | Ofurace | Thiram |
| 198. | Ipconazole | Flutolanil | Ofurace | Captan |
| 199. | Ipconazole | Flutolanil | Ofurace | Captafol |
| 200. | Ipconazole | Flutolanil | Ofurace | Chlorothalonil |
| 201. | Ipconazole | Furametpyr | Benalaxyl | Thiabendazole |

TABLE 1-continued

| Sr. No. | Demethylation inhibitor | Succinate dehydrogenase inhibitor | RNA polymerase I inhibitor | β-tubulin assembly inhibitor and/or multisite fungicide |
|---|---|---|---|---|
| 202. | Ipconazole | Furametpyr | Benalaxyl | Thiophanate |
| 203. | Ipconazole | Furametpyr | Benalaxyl | Thiophanate-methyl |
| 204. | Ipconazole | Furametpyr | Benalaxyl | Mancozeb |
| 205. | Ipconazole | Furametpyr | Benalaxyl | Thiram |
| 206. | Ipconazole | Furametpyr | Benalaxyl | Captan |
| 207. | Ipconazole | Furametpyr | Benalaxyl | Captafol |
| 208. | Ipconazole | Furametpyr | Benalaxyl | Chlorothalonil |
| 209. | Ipconazole | Furametpyr | Furalaxyl | Thiabendazole |
| 210. | Ipconazole | Furametpyr | Furalaxyl | Thiophanate |
| 211. | Ipconazole | Furametpyr | Furalaxyl | Thiophanate-methyl |
| 212. | Ipconazole | Furametpyr | Furalaxyl | Mancozeb |
| 213. | Ipconazole | Furametpyr | Furalaxyl | Thiram |
| 214. | Ipconazole | Furametpyr | Furalaxyl | Captan |
| 215. | Ipconazole | Furametpyr | Furalaxyl | Captafol |
| 216. | Ipconazole | Furametpyr | Furalaxyl | Chlorothalonil |
| 217. | Ipconazole | Furametpyr | Metalaxyl/Metalaxyl-m | Thiabendazole |
| 218. | Ipconazole | Furametpyr | Metalaxyl/Metalaxyl-m | Thiophanate |
| 219. | Ipconazole | Furametpyr | Metalaxyl/Metalaxyl-m | Thiophanate-methyl |
| 220. | Ipconazole | Furametpyr | Metalaxyl/Metalaxyl-m | Mancozeb |
| 221. | Ipconazole | Furametpyr | Metalaxyl/Metalaxyl-m | Thiram |
| 222. | Ipconazole | Furametpyr | Metalaxyl/Metalaxyl-m | Captan |
| 223. | Ipconazole | Furametpyr | Metalaxyl/Metalaxyl-m | Captafol |
| 224. | Ipconazole | Furametpyr | Metalaxyl/Metalaxyl-m | Chlorothalonil |
| 225. | Ipconazole | Furametpyr | Oxadixyl | Thiabendazole |
| 226. | Ipconazole | Furametpyr | Oxadixyl | Thiophanate |
| 227. | Ipconazole | Furametpyr | Oxadixyl | Thiophanate-methyl |
| 228. | Ipconazole | Furametpyr | Oxadixyl | Mancozeb |
| 229. | Ipconazole | Furametpyr | Oxadixyl | Thiram |
| 230. | Ipconazole | Furametpyr | Oxadixyl | Captan |
| 231. | Ipconazole | Furametpyr | Oxadixyl | Captafol |
| 232. | Ipconazole | Furametpyr | Oxadixyl | Chlorothalonil |
| 233. | Ipconazole | Furametpyr | Ofurace | Thiabendazole |
| 234. | Ipconazole | Furametpyr | Ofurace | Thiophanate |
| 235. | Ipconazole | Furametpyr | Ofurace | Thiophanate-methyl |
| 236. | Ipconazole | Furametpyr | Ofurace | Mancozeb |
| 237. | Ipconazole | Furametpyr | Ofurace | Thiram |
| 238. | Ipconazole | Furametpyr | Ofurace | Captan |
| 239. | Ipconazole | Furametpyr | Ofurace | Captafol |
| 240. | Ipconazole | Furametpyr | Ofurace | Chlorothalonil |
| 241. | Ipconazole | Mepronil | Benalaxyl | Thiabendazole |
| 242. | Ipconazole | Mepronil | Benalaxyl | Thiophanate |
| 243. | Ipconazole | Mepronil | Benalaxyl | Thiophanate-methyl |
| 244. | Ipconazole | Mepronil | Benalaxyl | Mancozeb |
| 245. | Ipconazole | Mepronil | Benalaxyl | Thiram |
| 246. | Ipconazole | Mepronil | Benalaxyl | Captan |
| 247. | Ipconazole | Mepronil | Benalaxyl | Captafol |
| 248. | Ipconazole | Mepronil | Benalaxyl | Chlorothalonil |
| 249. | Ipconazole | Mepronil | Furalaxyl | Thiabendazole |
| 250. | Ipconazole | Mepronil | Furalaxyl | Thiophanate |
| 251. | Ipconazole | Mepronil | Furalaxyl | Thiophanate-methyl |
| 252. | Ipconazole | Mepronil | Furalaxyl | Mancozeb |
| 253. | Ipconazole | Mepronil | Furalaxyl | Thiram |
| 254. | Ipconazole | Mepronil | Furalaxyl | Captan |
| 255. | Ipconazole | Mepronil | Furalaxyl | Captafol |
| 256. | Ipconazole | Mepronil | Furalaxyl | Chlorothalonil |
| 257. | Ipconazole | Mepronil | Metalaxyl/Metalaxyl-m | Thiabendazole |
| 258. | Ipconazole | Mepronil | Metalaxyl/Metalaxyl-m | Thiophanate |
| 259. | Ipconazole | Mepronil | Metalaxyl/Metalaxyl-m | Thiophanate-methyl |
| 260. | Ipconazole | Mepronil | Metalaxyl/Metalaxyl-m | Mancozeb |
| 261. | Ipconazole | Mepronil | Metalaxyl/Metalaxyl-m | Thiram |
| 262. | Ipconazole | Mepronil | Metalaxyl/Metalaxyl-m | Captan |
| 263. | Ipconazole | Mepronil | Metalaxyl/Metalaxyl-m | Captafol |
| 264. | Ipconazole | Mepronil | Metalaxyl/Metalaxyl-m | Chlorothalonil |
| 265. | Ipconazole | Mepronil | Oxadixyl | Thiabendazole |
| 266. | Ipconazole | Mepronil | Oxadixyl | Thiophanate |
| 267. | Ipconazole | Mepronil | Oxadixyl | Thiophanate-methyl |
| 268. | Ipconazole | Mepronil | Oxadixyl | Mancozeb |
| 269. | Ipconazole | Mepronil | Oxadixyl | Thiram |
| 270. | Ipconazole | Mepronil | Oxadixyl | Captan |
| 271. | Ipconazole | Mepronil | Oxadixyl | Captafol |
| 272. | Ipconazole | Mepronil | Oxadixyl | Chlorothalonil |
| 273. | Ipconazole | Mepronil | Ofurace | Thiabendazole |
| 274. | Ipconazole | Mepronil | Ofurace | Thiophanate |
| 275. | Ipconazole | Mepronil | Ofurace | Thiophanate-methyl |
| 276. | Ipconazole | Mepronil | Ofurace | Mancozeb |
| 277. | Ipconazole | Mepronil | Ofurace | Thiram |
| 278. | Ipconazole | Mepronil | Ofurace | Captan |
| 279. | Ipconazole | Mepronil | Ofurace | Captafol |
| 280. | Ipconazole | Mepronil | Ofurace | Chlorothalonil |
| 281. | Ipconazole | Oxycarboxin | Benalaxyl | Thiabendazole |
| 282. | Ipconazole | Oxycarboxin | Benalaxyl | Thiophanate |
| 283. | Ipconazole | Oxycarboxin | Benalaxyl | Thiophanate-methyl |
| 284. | Ipconazole | Oxycarboxin | Benalaxyl | Mancozeb |
| 285. | Ipconazole | Oxycarboxin | Benalaxyl | Thiram |
| 286. | Ipconazole | Oxycarboxin | Benalaxyl | Captan |
| 287. | Ipconazole | Oxycarboxin | Benalaxyl | Captafol |
| 288. | Ipconazole | Oxycarboxin | Benalaxyl | Chlorothalonil |
| 289. | Ipconazole | Oxycarboxin | Furalaxyl | Thiabendazole |
| 290. | Ipconazole | Oxycarboxin | Furalaxyl | Thiophanate |
| 291. | Ipconazole | Oxycarboxin | Furalaxyl | Thiophanate-methyl |
| 292. | Ipconazole | Oxycarboxin | Furalaxyl | Mancozeb |
| 293. | Ipconazole | Oxycarboxin | Furalaxyl | Thiram |
| 294. | Ipconazole | Oxycarboxin | Furalaxyl | Captan |
| 295. | Ipconazole | Oxycarboxin | Furalaxyl | Captafol |
| 296. | Ipconazole | Oxycarboxin | Furalaxyl | Chlorothalonil |
| 297. | Ipconazole | Oxycarboxin | Metalaxyl/Metalaxyl-m | Thiabendazole |
| 298. | Ipconazole | Oxycarboxin | Metalaxyl/Metalaxyl-m | Thiophanate |
| 299. | Ipconazole | Oxycarboxin | Metalaxyl/Metalaxyl-m | Thiophanate-methyl |
| 300. | Ipconazole | Oxycarboxin | Metalaxyl/Metalaxyl-m | Mancozeb |
| 301. | Ipconazole | Oxycarboxin | Metalaxyl/Metalaxyl-m | Thiram |
| 302. | Ipconazole | Oxycarboxin | Metalaxyl/Metalaxyl-m | Captan |
| 303. | Ipconazole | Oxycarboxin | Metalaxyl/Metalaxyl-m | Captafol |
| 304. | Ipconazole | Oxycarboxin | Metalaxyl/Metalaxyl-m | Chlorothalonil |
| 305. | Ipconazole | Oxycarboxin | Oxadixyl | Thiabendazole |
| 306. | Ipconazole | Oxycarboxin | Oxadixyl | Thiophanate |
| 307. | Ipconazole | Oxycarboxin | Oxadixyl | Thiophanate-methyl |
| 308. | Ipconazole | Oxycarboxin | Oxadixyl | Mancozeb |
| 309. | Ipconazole | Oxycarboxin | Oxadixyl | Thiram |
| 310. | Ipconazole | Oxycarboxin | Oxadixyl | Captan |
| 311. | Ipconazole | Oxycarboxin | Oxadixyl | Captafol |
| 312. | Ipconazole | Oxycarboxin | Oxadixyl | Chlorothalonil |
| 313. | Ipconazole | Oxycarboxin | Ofurace | Thiabendazole |
| 314. | Ipconazole | Oxycarboxin | Ofurace | Thiophanate |
| 315. | Ipconazole | Oxycarboxin | Ofurace | Thiophanate-methyl |
| 316. | Ipconazole | Oxycarboxin | Ofurace | Mancozeb |
| 317. | Ipconazole | Oxycarboxin | Ofurace | Thiram |
| 318. | Ipconazole | Oxycarboxin | Ofurace | Captan |
| 319. | Ipconazole | Oxycarboxin | Ofurace | Captafol |
| 320. | Ipconazole | Oxycarboxin | Ofurace | Chlorothalonil |
| 321. | Ipconazole | Penthiopyrad | Benalaxyl | Thiabendazole |
| 322. | Ipconazole | Penthiopyrad | Benalaxyl | Thiophanate |
| 323. | Ipconazole | Penthiopyrad | Benalaxyl | Thiophanate-methyl |
| 324. | Ipconazole | Penthiopyrad | Benalaxyl | Mancozeb |
| 325. | Ipconazole | Penthiopyrad | Benalaxyl | Thiram |
| 326. | Ipconazole | Penthiopyrad | Benalaxyl | Captan |
| 327. | Ipconazole | Penthiopyrad | Benalaxyl | Captafol |

TABLE 1-continued

| Sr. No. | Demethyl-ation inhibitor | Succinate dehydro-genase inhibitor | RNA polymerase I inhibitor | β-tubulin assembly inhibitor and/or multisite fungicide |
|---|---|---|---|---|
| 328. | Ipconazole | Penthiopyrad | Benalaxyl | Chlorothalonil |
| 329. | Ipconazole | Penthiopyrad | Furalaxyl | Thiabendazole |
| 330. | Ipconazole | Penthiopyrad | Furalaxyl | Thiophanate |
| 331. | Ipconazole | Penthiopyrad | Furalaxyl | Thiophanate-methyl |
| 332. | Ipconazole | Penthiopyrad | Furalaxyl | Mancozeb |
| 333. | Ipconazole | Penthiopyrad | Furalaxyl | Thiram |
| 334. | Ipconazole | Penthiopyrad | Furalaxyl | Captan |
| 335. | Ipconazole | Penthiopyrad | Furalaxyl | Captafol |
| 336. | Ipconazole | Penthiopyrad | Furalaxyl | Chlorothalonil |
| 337. | Ipconazole | Penthiopyrad | Metalaxyl/Metalaxyl-m | Thiabendazole |
| 338. | Ipconazole | Penthiopyrad | Metalaxyl/Metalaxyl-m | Thiophanate |
| 339. | Ipconazole | Penthiopyrad | Metalaxyl/Metalaxyl-m | Thiophanate-methyl |
| 340. | Ipconazole | Penthiopyrad | Metalaxyl/Metalaxyl-m | Mancozeb |
| 341. | Ipconazole | Penthiopyrad | Metalaxyl/Metalaxyl-m | Thiram |
| 342. | Ipconazole | Penthiopyrad | Metalaxyl/Metalaxyl-m | Captan |
| 343. | Ipconazole | Penthiopyrad | Metalaxyl/Metalaxyl-m | Captafol |
| 344. | Ipconazole | Penthiopyrad | Metalaxyl/Metalaxyl-m | Chlorothalonil |
| 345. | Ipconazole | Penthiopyrad | Oxadixyl | Thiabendazole |
| 346. | Ipconazole | Penthiopyrad | Oxadixyl | Thiophanate |
| 347. | Ipconazole | Penthiopyrad | Oxadixyl | Thiophanate-methyl |
| 348. | Ipconazole | Penthiopyrad | Oxadixyl | Mancozeb |
| 349. | Ipconazole | Penthiopyrad | Oxadixyl | Thiram |
| 350. | Ipconazole | Penthiopyrad | Oxadixyl | Captan |
| 351. | Ipconazole | Penthiopyrad | Oxadixyl | Captafol |
| 352. | Ipconazole | Penthiopyrad | Oxadixyl | Chlorothalonil |
| 353. | Ipconazole | Penthiopyrad | Ofurace | Thiabendazole |
| 354. | Ipconazole | Penthiopyrad | Ofurace | Thiophanate |
| 355. | Ipconazole | Penthiopyrad | Ofurace | Thiophanate-methyl |
| 356. | Ipconazole | Penthiopyrad | Ofurace | Mancozeb |
| 357. | Ipconazole | Penthiopyrad | Ofurace | Thiram |
| 358. | Ipconazole | Penthiopyrad | Ofurace | Captan |
| 359. | Ipconazole | Penthiopyrad | Ofurace | Captafol |
| 360. | Ipconazole | Penthiopyrad | Ofurace | Chlorothalonil |
| 361. | Ipconazole | Thifluzamide | Benalaxyl | Thiabendazole |
| 362. | Ipconazole | Thifluzamide | Benalaxyl | Thiophanate |
| 363. | Ipconazole | Thifluzamide | Benalaxyl | Thiophanate-methyl |
| 364. | Ipconazole | Thifluzamide | Benalaxyl | Mancozeb |
| 365. | Ipconazole | Thifluzamide | Benalaxyl | Thiram |
| 366. | Ipconazole | Thifluzamide | Benalaxyl | Captan |
| 367. | Ipconazole | Thifluzamide | Benalaxyl | Captafol |
| 368. | Ipconazole | Thifluzamide | Benalaxyl | Chlorothalonil |
| 369. | Ipconazole | Thifluzamide | Furalaxyl | Thiabendazole |
| 370. | Ipconazole | Thifluzamide | Furalaxyl | Thiophanate |
| 371. | Ipconazole | Thifluzamide | Furalaxyl | Thiophanate-methyl |
| 372. | Ipconazole | Thifluzamide | Furalaxyl | Mancozeb |
| 373. | Ipconazole | Thifluzamide | Furalaxyl | Thiram |
| 374. | Ipconazole | Thifluzamide | Furalaxyl | Captan |
| 375. | Ipconazole | Thifluzamide | Furalaxyl | Captafol |
| 376. | Ipconazole | Thifluzamide | Furalaxyl | Chlorothalonil |
| 377. | Ipconazole | Thifluzamide | Metalaxyl/Metalaxyl-m | Thiabendazole |
| 378. | Ipconazole | Thifluzamide | Metalaxyl/Metalaxyl-m | Thiophanate |
| 379. | Ipconazole | Thifluzamide | Metalaxyl/Metalaxyl-m | Thiophanate-methyl |
| 380. | Ipconazole | Thifluzamide | Metalaxyl/Metalaxyl-m | Mancozeb |
| 381. | Ipconazole | Thifluzamide | Metalaxyl/Metalaxyl-m | Thiram |
| 382. | Ipconazole | Thifluzamide | Metalaxyl/Metalaxyl-m | Captan |
| 383. | Ipconazole | Thifluzamide | Metalaxyl/Metalaxyl-m | Captafol |
| 384. | Ipconazole | Thifluzamide | Metalaxyl/Metalaxyl-m | Chlorothalonil |
| 385. | Ipconazole | Thifluzamide | Oxadixyl | Thiabendazole |
| 386. | Ipconazole | Thifluzamide | Oxadixyl | Thiophanate |

TABLE 1-continued

| Sr. No. | Demethyl-ation inhibitor | Succinate dehydro-genase inhibitor | RNA polymerase I inhibitor | β-tubulin assembly inhibitor and/or multisite fungicide |
|---|---|---|---|---|
| 387. | Ipconazole | Thifluzamide | Oxadixyl | Thiophanate-methyl |
| 388. | Ipconazole | Thifluzamide | Oxadixyl | Mancozeb |
| 389. | Ipconazole | Thifluzamide | Oxadixyl | Thiram |
| 390. | Ipconazole | Thifluzamide | Oxadixyl | Captan |
| 391. | Ipconazole | Thifluzamide | Oxadixyl | Captafol |
| 392. | Ipconazole | Thifluzamide | Oxadixyl | Chlorothalonil |
| 393. | Ipconazole | Thifluzamide | Ofurace | Thiabendazole |
| 394. | Ipconazole | Thifluzamide | Ofurace | Thiophanate |
| 395. | Ipconazole | Thifluzamide | Ofurace | Thiophanate-methyl |
| 396. | Ipconazole | Thifluzamide | Ofurace | Mancozeb |
| 397. | Ipconazole | Thifluzamide | Ofurace | Thiram |
| 398. | Ipconazole | Thifluzamide | Ofurace | Captan |
| 399. | Ipconazole | Thifluzamide | Ofurace | Captafol |
| 400. | Ipconazole | Thifluzamide | Ofurace | Chlorothalonil |

In some embodiments, the combinations according to the present disclosure are used to treat plant propagation materials.

In some embodiments, the combinations according to the present disclosure are used to treat seeds, a type of plant propagation materials.

The combinations of present disclosure may be used for plant propagation materials treatment and are efficacious in protecting the materials and/or the plant originating from them during target fungi's life cycle in which it causes injury to the seed or plant.

In still another embodiment, the combinations of present disclosure are used to treat soybean seeds.

In still another embodiment, the fungicides in the combinations according to the present disclosure are formulated together and applied as a pre-emergence and/or a post-emergence crop treatment.

In still another embodiment, the fungicides in the combinations according to the present disclosure are formulated separately and applied sequentially.

In still another embodiment, the fungicides in the combinations according to the present disclosure are applied to the soil.

In still another embodiment, the fungicides in the combinations according to the present disclosure are applied to the soil shortly after sowing in an in furrow-treatment.

In an aspect, the present disclosure provides a composition comprising:
  a) at least one demethylation inhibitor;
  b) at least one succinate dehydrogenase inhibitor;
  c) at least one RNA polymerase I inhibitor; and
  d) at least one ß-tubulin assembly inhibitor and/or at least one multi-site fungicide.

In an aspect, the present disclosure provides a composition comprising:
  a) at least one demethylation inhibitor;
  b) at least one succinate dehydrogenase inhibitor;
  c) at least one RNA polymerase I inhibitor;
  d) at least one ß-tubulin assembly inhibitor;
  e) at least one multi-site fungicide; and
  f) at least one agriculturally acceptable excipient.

In an aspect, the present disclosure provides a composition comprising:
  a) at least one demethylation inhibitor;
  b) at least one succinate dehydrogenase inhibitor;
  c) at least one RNA polymerase I inhibitor;
  d) at least one ß-tubulin assembly inhibitor; and
  e) at least one agriculturally acceptable excipient.

In an embodiment, the agriculturally acceptable excipient can be selected from one or more of diluents, emulsifiers, fillers, anti-foaming agents, thickening agents, anti-freezing agents, freezing agents, surfactants, preservatives, coloring agents, pH adjusting agents, dispersing agents, wetting agents and solvents. However, it should be appreciated that any other agriculturally acceptable excipients, as known to a person skilled in the art, may be used to serve its intended purpose. In an embodiment, the agriculturally acceptable excipients are present in an amount ranging from 0.01% to 90% by weight of the total composition.

In an embodiment, the emulsifiers which can be advantageously employed herein can be readily determined by those skilled in the art, include various non-ionic, anionic, cationic and amphoteric emulsifiers, or a blend of two or more emulsifiers. Examples of nonionic emulsifiers useful in preparing an emulsifiable concentrate, for example, include the polyalkylene glycol ethers and condensation products of alkyl and aryl phenols, aliphatic alcohols, aliphatic amines or fatty acids with ethylene oxide, propylene oxides such as the ethoxylated alkyl phenols and carboxylic esters solubilized with the polyol or polyoxyalkylene. Cationic emulsifiers include quaternary ammonium compounds and fatty amine salts. Anionic emulsifiers include the oil-soluble salts (e.g., calcium) of alkylaryl sulfonic acids, oil-soluble salts or sulfated polyglycol ethers and appropriate salts of phosphated polyglycol ether.

In an embodiment, colorants comprise iron oxide, titanium oxide and Prussian Blue, and organic dyestuffs, such as alizarin dyestuffs, azo dyestuffs or metal phthalocyanine dyestuffs, and trace elements, such as salts of iron, manganese, boron, copper, cobalt, molybdenum, zinc, and combinations thereof.

Another embodiment involves addition of a thickener or binder which may comprise, but is not limited to, molasses, granulated sugar, alginates, karaya gum, jaguar gum, tragacanth gum, polysaccharide gum, mucilage, xanthan gum or combination thereof. In another embodiment, the binder may be selected from silicates such as magnesium aluminium silicate, polyvinyl acetates, polyvinyl acetate copolymers, polyvinyl alcohols, polyvinyl alcohol copolymers, celluloses, including ethylcelluloses and methylcelluloses, hydroxymethyl celluloses, hydroxypropylcelluloses, hydroxymethylpropyl-celluloses, polyvinylpyrolidones, dextrins, malto-dextrins, polysaccharides, fats, oils, proteins, gum arabics, shellacs, vinylidene chloride, vinylidene chloride copolymers, calcium lignosulfonates, acrylic copolymers, starches, polyvinylacrylates, zeins, gelatin, carboxymethylcellulose, chitosan, polyethylene oxide, acrylimide polymers and copolymers, polyhydroxyethyl acrylate, methylacrylimide monomers, alginate, ethylcellulose, polychloroprene and syrups or mixtures thereof; polymers and copolymers of vinyl acetate, methyl cellulose, vinylidene chloride, acrylic, cellulose, polyvinylpyrrolidone and polysaccharide; polymers and copolymers of vinylidene chloride and vinyl acetate-ethylene copolymers; combinations of polyvinyl alcohol and sucrose; plasticizers such as glycerol, propylene glycol, polyglycols, and combinations thereof.

In another embodiment, the antifreeze agent(s) added to the composition may be alcohols comprising, but not limited to, ethylene glycol, 1,2-propylene glycol, 1,3-propylene glycol, 1,2-butanediol, 1,3-butanediol, 1,4-butanediol, 1,4-pentanediol, 3-methyl-1,5-pentanediol, 2,3-dimethyl-2,3-butanediol, trimethylol propane, mannitol, sorbitol, glycerol, pentaerythritol, 1,4-cyclohexanedimethanol, xylenol, bisphenols such as bisphenol A and the like, and combinations thereof. In addition, ether alcohols such as diethylene glycol, triethylene glycol, tetraethylene glycol, polyoxyethylene or polyoxypropylene glycols of molecular weight up to about 4000, diethylene glycol monomethylether, diethylene glycol monoethylether, triethylene glycol monomethylether, butoxyethanol, butylene glycol monobutylether, dipentaerythritol, tripentaerythritol, tetrapentaerythritol, diglycerol, triglycerol, tetraglycerol, pentaglycerol, hexaglycerol, heptaglycerol, octaglycerol, and combinations thereof may be employed.

According to an embodiment, biocides may comprise benzothiazoles, 1,2-benzisothiazolin-3-one, sodium dichloro-s-triazinetrione, sodium benzoate, potassium sorbate, 1,2-phenyl-isothiazolin-3-one, inter chloroxylenol paraoxybenzoate butyl, and combinations thereof.

According to an embodiment, the antifoam agent may comprise polydimethoxysiloxane, polydimethylsiloxane, alkyl poly acrylates, castor oil, fatty acids, fatty acids esters, fatty acids sulfates, fatty alcohols, fatty alcohol esters, fatty alcohol sulfates, olive oil, mono and di glycerides, paraffin oil, paraffin wax, polypropylene glycol, silicone oils, vegetable fats, vegetable fats sulfates, vegetable oils, vegetable oil sulfates, vegetable waxes, vegetable wax sulfates, agents based on silicon or magnesium stearate, and combinations thereof.

The agrochemical formulation may also comprise one or more antioxidants. Preferably, the agrochemical formulation comprises an antioxidant. Antioxidants comprise, for example, amino acids (e.g., glycine, histidine, tyrosine, tryptophan) and derivatives thereof, imidazole and imidazole derivatives (e.g., urocanic acid), peptides, such as, for example, D,L-carnosine, D-carnosine, L-carnosine and derivatives thereof (e.g., anserine), carotenoids, carotenes (e.g., $\alpha$-carotene, $\beta$-carotene, lycopene) and derivatives thereof, lipoic acid and derivatives thereof (e.g., dihydrolipoic acid), aurothioglucose, propylthiouracil and further thio compounds (e.g., thioglycerol, thiosorbitol, thioglycolic acid, thioredoxin, glutathione, cysteine, cystine, cystamine and the glycosyl, N-acetyl, methyl, ethyl, propyl, amyl, butyl, lauryl, palmitoyl, oleyl, $\gamma$-linoleyl, cholesteryl and glyceryl esters thereof), and salts thereof, dilauryl thiodipropionate, distearyl thiodipropionate, thiodipropionic acid and derivatives thereof (esters, ethers, peptides, lipids, nucleotides, nucleosides and salts), and sulfoximine compounds (e.g., buthionine sulfoximines, homocysteine sulfoximine, buthionine sulfones, penta-, hexa-, heptathionine sulfoximine) in very low tolerated doses (e.g., pmol/kg to pmol/kg), also metal chelating agents (e.g., $\alpha$-hydroxy fatty acids, EDTA, EGTA, phytic acid, lactoferrin), $\alpha$-hydroxy acids (e.g., citric acid, lactic acid, malic acid), humic acids, bile acid, bile extracts, gallic esters (e.g., propyl, octyl and dodecyl gallate), flavonoids, catechins, bilirubin, biliverdin and derivatives thereof, unsaturated fatty acids and derivatives thereof (e.g., $\gamma$-linolenic acid, linoleic acid, arachidonic acid, oleic acid), folic acid and derivatives thereof, hydroquinone and derivatives thereof (e.g., arbutin), ubiquinone and ubiquinol, and derivatives thereof, vitamin C and derivatives thereof (e.g., ascorbyl palmitate, stearate, dipalmitate, acetate, Mg ascorbyl phosphates, sodium and magnesium ascorbate, disodium ascorbyl phosphate and sulfate, potassium ascorbyl tocopheryl phosphate, chitosan ascorbate), isoascorbic acid and derivatives thereof, tocopherols and derivatives thereof (e.g., tocopheryl acetate, linoleate, oleate and succinate, tocophereth-5, tocophereth-10, tocophereth-12, tocophereth-18, tocophereth-50, tocophersolan), vitamin A and derivatives (e.g., vitamin A palmitate), the coniferyl benzoate of benzoin resin, rutin, rutinic acid and derivatives thereof, disodium rutinyl disulfate, cinnamic acid and derivatives thereof (e.g., ferulic acid, ethyl ferulate, caffeeic acid), kojic acid, chitosan glycolate and salicylate, butylhydroxytoluene, butylhydroxyanisol, nordihydroguaiacic acid, nordihydroguaiaretic acid, trihydroxybutyrophenone, uric acid and derivatives thereof, mannose and derivatives thereof, selenium and selenium derivatives (e.g., selenomethionine), stilbenes and stilbene derivatives (e.g. stilbene oxide, trans-stilbene oxide), and combinations thereof. According to the invention, derivatives (salts, esters, sugars, nucleotides, nucleosides, peptides and lipids) and mixtures of these specified active ingredients or plant extracts (e.g., tea tree oil, rosemary extract and rosemarinic acid) which comprise these antioxidants can be used. In general, mixtures of the aforementioned antioxidants are possible.

According to an embodiment, examples of solvents are water, aromatic solvents (for example, xylene), paraffins (for example mineral oil fractions such as kerosene or diesel oil), coal tar oils and oils of vegetable or animal origin, aliphatic, cyclic and aromatic hydrocarbons, for example toluene, xylene, paraffin, tetrahydronaphthalene, alkylated naphthalenes or their derivatives, alcohols (for example methanol, butanol, pentanol, benzyl alcohol, cyclohexanol), ketones (for example cyclohexanone, gamma-butyrolactone), pyrrolidones (NMP, NEP, NOP), acetates (glycol diacetate), glycols, fatty acid dimethylamides, fatty acids and fatty acid esters, isophorone and dimethylsulfoxide. In principle, solvent mixtures may also be used.

Exemplary preservatives are for example 1,2-benzisothiazolin-3-one and/or 2-Methyl-2H-isothiazol-3-one or sodium benzoate and benzoic acid.

In an embodiment, the present disclosure provides a method of controlling fungi by applying a combination comprising:
  a) at least one demethylation inhibitor;
  b) at least one succinate dehydrogenase inhibitor;
  c) at least one RNA polymerase I inhibitor; and
  d) at least one ß-tubulin assembly inhibitor and/or at least one multi-site fungicide.

In another embodiment, the present disclosure provides a method of controlling fungi by applying a composition comprising:
  a) at least one demethylation inhibitor;
  b) at least one succinate dehydrogenase inhibitor;
  c) at least one RNA polymerase I inhibitor; and
  d) at least one ß-tubulin assembly inhibitor and/or at least one multi-site fungicide.

In another embodiment, the present disclosure provides a method of controlling fungi by applying a composition comprising:
  a) at least one demethylation inhibitor;
  b) at least one succinate dehydrogenase inhibitor;
  c) at least one RNA polymerase I inhibitor;
  d) at least one ß-tubulin assembly inhibitor; and
  e) at least one agriculturally acceptable excipient.

In an embodiment of the present disclosure, the individual fungicides may be formulated as a kit-of-parts containing various components that may be mixed prior to spraying.

According to an embodiment of the present disclosure, a kit-of-parts comprising an agrochemical composition is provided. The kit comprises a plurality of components, each of which components may include at least one of the ingredients of the composition of the present disclosure.

In an embodiment, the fungicidal combination is a kit of parts comprising a plurality of components to be mixed, wherein said plurality of components comprise:

a) at least one demethylation inhibitor;
  b) at least one succinate dehydrogenase inhibitor;
  c) at least one RNA polymerase I inhibitor; and
  d) at least one ß-tubulin assembly inhibitor and/or at least one multi-site fungicide.

One or more of the components may already be combined or pre-formulated. In those embodiments where more than two components are provided in a kit, the components may already be combined and as such are packaged in a single container such as a vial, bottle, can, pouch, bag, or canister.

An embodiment of the present disclosure provides a method of applying a fungicidal combination for controlling fungal infestation in crops comprising applying:
  a demethylation inhibitor in an amount ranging from 1 to 5 g ai/100 kg of seeds;
  a ß-tubulin assembly inhibitor in an amount ranging from 10 to 60 g ai/100 kg of seeds;
  an SDH inhibitor in an amount ranging from 10 to 50 g ai/100 kg of seeds; and
  an RNA polymerase I inhibitor in an amount ranging from 1 to 5 g ai/100 kg of seeds.

Another embodiment of the present disclosure provides a method of applying a fungicidal combination for controlling fungal infestation in crops comprising applying:
  ipconazole in an amount ranging from 1 to 5 g ai/100 kg of seeds;
  thiabendazole in an amount ranging from 10 to 60 g ai/100 kg of seeds;
  carboxin in an amount ranging from 10 to 50 g ai/100 kg of seeds; and
  metalaxyl or metalaxyl-m in an amount ranging from 1 to 5 g ai/100 kg of seeds.

The combinations and the compositions according to the present disclosure are effective for controlling the plant diseases including the following
  Diseases in peanut, for example seed rot, crown rot, damping off and seedling blight;
  Diseases in cotton, for example seed rot, damping off, and seedling blight;
  Diseases in rice, for example: sheath blight and sheath spot;
  Diseases in corn, for example: sclerotial disease, leaf blight, banded leaf, crown and brace rot;
  Diseases in sorghum, for example: leaf blight and banded leaf;
  Diseases in bean, for example: leaf blight, web blight and root rot;
  Diseases in soybean, for example: leaf blight, damping off, and root rot;
  Diseases in crimson clover, for example: summer blight;
  Diseases in camphor seedlings, for example: southern blight;
  Diseases in turfgrass, for example: brown patch and large patch;
  Diseases in cabbage, for example: rot;
  Diseases in lettuce, for example: bottom rot;
  Diseases in buckwheat, for example: damping off;
  Diseases in carrot, for example: damping off and crown root rot;
  Diseases in crucifers, for example: damping off;
  Diseases in strawberry, for example: bud rot;
  Diseases in tulip, for example: leaf blight;
  Diseases in Japanese radish, for example: root rot;
  Diseases in edible burdock, for example: black scurf;
  Diseases in sugar beet, for example: damping off, root rot and leaf blight;
  Diseases in konjac, for example: root rot;

Diseases in potatoes, for example: black scurf and stem/ stolon cankers, and damping off;

Diseases in tobacco, for example: target spot;

Diseases in tomato, for example: leaf blight and fruit rot;

Diseases in eggplant, for example: brown spot

Diseases in pea, for example: stem rot;

Diseases in snap bean, for example: pod rot;

Diseases in cereals, for example: seed rot, damping off, smut, bunt, seedling blight and bare patches.

In an embodiment, exemplary target crops include cereals such as wheat, barley, rye, oats, corn, rice, sorghum, triticale and related crops; beets such as sugar beet and fodder beet; leguminous plants such as beans, lentils, peas, peanut, soybean, chickpeas; dry bean, dry pea, rye, oil plants such as rape, mustard, sunflowers; cucurbits such as marrows, cucumbers, melons; fibre plants such as cotton, flax, hemp, jute; vegetables such spinach, lettuce, asparagus, cabbages, carrots, onions, tomatoes, potatoes, paprika as well as orna-mentals such as flowers, shrubs, broad-leaved trees and evergreens, such as conifers.

In one or more embodiments, the combinations and compositions according to the present disclosure are effec-tive in control of *Cylindrocladium parasiticum, Sclerotium rolfsii, Penicillium* spp., *Pythium* spp., *Rhizoctonia* genus including *Rhizoctonia Solani, Ustilago* genus including *Ustilago Tritici,* Tilletia genus including Tilletia *Tritici, Fusarium* genus including *Fusarium Pallidoroseum, Asper-gillus* genus including *Aspergillus Niger* and *Aspergillus flavus, Phomopsis* genus including *Phomopsis longicolla, Ascochyta* genus including *Ascochyta lentis, Ascochyta pinodella, Ascochyta pinodes, Ascochyta pisi, Macropho-mina* genus including *Macrophomina faseolina, Phoma* including *Phoma sorghina, Slerotinia* including *Slerotinia slerotiorum, Alternaria alternata, Aphanomyces euteiches* f. sp. *pisi, Botryotinia fuckeliana, Botrytis cinerea, Cer-cospora pisa-sativae, Chalara elegans, Cladosporium cla-dosporioides* f. sp. *pisicoia, Cladosporium pisicoia, Colle-totrichum gloeosporioides, Colletotrichum pisi, Erysiphe pisi, Fusarium oxysporum, Fusarium oxysporum.* sp. *pisi, Fusarium solani, Fusicladium pisicoia, Glomerella cingu-lata, Mycosphaerella pinodes, Oidium* sp., *Peronospora viciae, Phoma pinodella, Pythium* spp., *Rhizoctonia solani, Sclerotinia sclerotiorum, Septoria pisi, Thanatephonis cuc-umeris, Thielaviopsis hasicola* and *Uromyces fabae,* Soy-bean diseases: *Cercospora kikuchii, Elsinoe glycines, Dia-porthe phaseolorum* var. *sojae, Septoria glycines, Cercospora sojina, Phakopsora pachyrhizi,* and *Phytoph-thora sojae.*

The invention is further illustrated by the following non-limiting examples.

EXAMPLES

Experiments were carried out to evaluate the bio-efficacy of combinations according to the present disclosure.

Example 1

The experiments were done to evaluate the effect of combinations according to present disclosure against peanut seed borne pathogens such as *Aspergillus flavus, A. niger, Rhizopus, Rhizoctonia* and *Fusarium* spp. Stressed and infected seeds with 60% germination percentage were used for conducting this experiment. Then fungicide treated seeds were planted on Apr. 30, 2021. Stand counts were recorded on May 11, 2001 and May 21, 2021. Dead plants were counted on May 2021 and Jun. 3, 2021.

Ipconazole and carboxin were used in 1.5 fl oz/cwt application rate, metalaxyl was used in 0.1 fl oz/cwt appli-cation rate, thiophanate-methyl was used in 0.28 fl oz/cwt application rate and thiabendazole was used in 0.64 fl oz/cwt application rate for treatment of seeds.

TABLE 2

| | Peanut Plants/ft | | % Dead Peanut plants | |
|---|---|---|---|---|
| Treatment details | 11 days after planting seeds | 21 days after planting seeds | 21 days after planting seeds | 33 days after planting seeds |
| Untreated Control | 0.7 | 1.9 | 2.5 | 9.6 |
| Ipconazole + Carboxin + Metalaxyl + Thiophanate-methyl | 2.5 | 3.6 | 0.1 | 0.1 |
| Ipconazole + Carboxin + Metalaxyl + thiabendazole | 2.0 | 3.6 | 0.1 | 0.2 |

Plant/ft is the number of emerged plants/foot of row.
% dead plants is % of emerged plants that were dead or dying/plot.

Example 2

Experiments were carried out to evaluate the bio-efficacy of comparative 3-way combination. The experiments were done to evaluate the effect of a 3 way combination (ipcona-zole+metalaxyl+carboxin) in comparison to the 4 way com-bination (ipconazole+metalaxyl+carboxin+thiabendazole) as disclosed in the present invention against peanut seed borne pathogens such as *Pythium* spp., *Rhizoctonia solani,* and *Fusarium* spp.

The amount of ipconazole was 2.5 g ai/100 kg, the amount of carboxin was 39.1 g ai/100 kg, the amount of metalaxyl was 2.1 g ai/100 kg and the amount of thiabendazole was 48.8 g ai/100 kg.

Treated seeds were evaluated for % of row feet infected based on disease loci per foot, roots per foot and also the yield was measured.

TABLE 3

| Sr no. | Treatment | TSWV* | Roots/ft | Yield (lbs/A) |
|---|---|---|---|---|
| 1 | Untreated | 42.4 | 0.8 | 2164 |
| 2 | Ipconazole + Carboxin + Metalaxyl (Comparative) | 35.2 | 2.9 | 4539 |
| 3 | Ipconazole + Carboxin + Metalaxyl + Thiabendazole | 23.6 | 3.0 | 4590 |

*TSWV—Percent of row feet infected based on disease loci (up to 12" liner row) per plot.

The above data establishes that addition of thiabendazole to the mixture of ipconazole+carboxin+metalaxyl results in enhanced efficacy, but not to the level seen for the four agent combination.

Example 3

Experiments were carried out to evaluate the bio-efficacy of comparative combinations (3 way) and combinations of the present invention (4 way). A fungicidal combination with and without thiabendazole was evaluated to check efficacy.

TABLE 4

| Sr no. | Treatment | Plant Stand/A @ 7 DAE | Plant Stand/A @ 14 DAE | % Dead plants/Plot @ 14 DAE |
|---|---|---|---|---|
| 1 | Untreated | 10214.07 | 30454.67 | 24.45 |
| 2 | Ipconazole + Carboxin + Metalaxyl (comparative) | 13944.21 | 41010.67 | 6.19 |
| 3 | Ipconazole + Carboxin + Metalaxyl + Thiabendazole | 15921.93 | 42163.33 | 5.48 |

The above data establishes that the four part mixtures comprising thiabendazole provide increased plant stand and enhanced disease control efficacy as compared to the mixtures without thiabendazole.

The invention claimed is:

1. A fungicidal combination, consisting of:

ipconazole, wherein the ipconazole is present in an amount in a range from 1 to 5 g/100 kg of seeds;

carboxin, wherein the carboxin is present in an amount in a range from 10 to 50 g/100 kg of seeds;

metalaxyl or metalaxyl-m, wherein the metalaxyl or the metalaxyl-m is present in an amount in a range from 1 to 5 g/100 kg of seeds; and thiabendazole, wherein the thiabendazole is present in an amount in a range from 10 to 60 g/100 kg of seeds.

2. A method of treating seeds, comprising applying to the seeds the combination of claim 1.

3. A method of controlling fungi comprising applying to the locus of a fungus the combination of claim 1.

4. A kit of parts comprising the fungicidal combination of claim 1.

\* \* \* \* \*